No. 611,230. Patented Sept. 27, 1898.
J. A. BERGER.
PNEUMATIC TIRE FASTENER.
(Application filed June 27, 1898.)

(No Model.)

WITNESSES:
Alexander Rudow
Alfred Metzger

INVENTOR
Joseph A. Berger,
BY
Wm R Baumeister
his ATTORNEY.

THE NORRIS PETERS CO., PHOTO-LITHO., WASHINGTON, D. C.

UNITED STATES PATENT OFFICE.

JOSEPH A. BERGER, OF CHICAGO, ILLINOIS, ASSIGNOR OF ONE-HALF TO JOHN P. LARSON, OF SAME PLACE.

PNEUMATIC-TIRE FASTENER.

SPECIFICATION forming part of Letters Patent No. 611,230, dated September 27, 1898.

Application filed June 27, 1898. Serial No. 684,528. (No model.)

*To all whom it may concern:*

Be it known that I, JOSEPH A. BERGER, a citizen of the United States of America, and a resident of the city of Chicago, in the county of Cook and State of Illinois, have invented certain new and useful Improvements in Pneumatic-Tire Fasteners, of which the following is a specification.

My invention relates to pneumatic-tire fasteners, and has particular reference to a form in which the nipples for fastening the spokes to the wheel-rim are utilized for removably securing the tire-jacket to the rim. To this end I use a spoke-nipple having a head thereon which engages with eyelets or sockets in the tire-jacket.

The construction and operation of my device will be understood from the following description, with reference to the accompanying drawings, in which—

Figure 1:
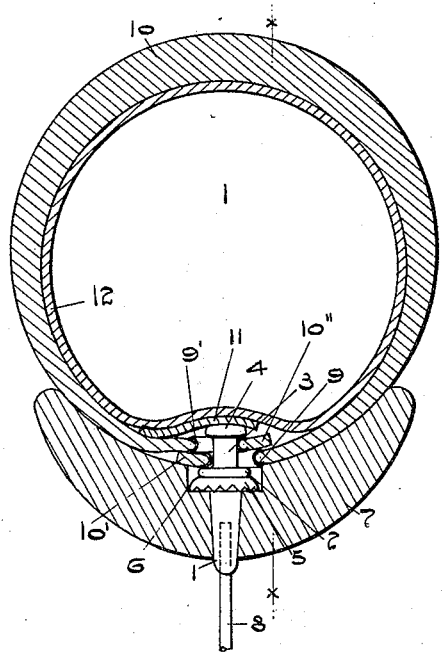
Figure 2:
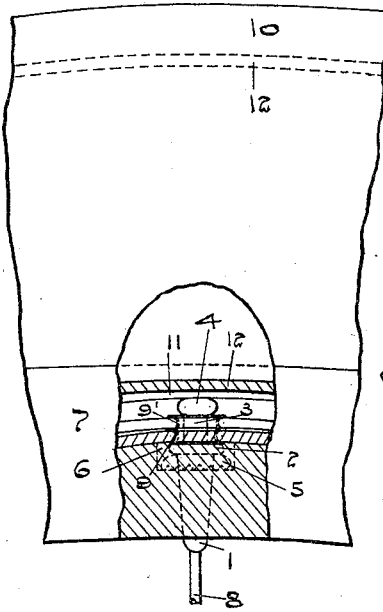
Figure 3:
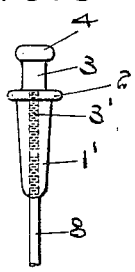
Figure 4:
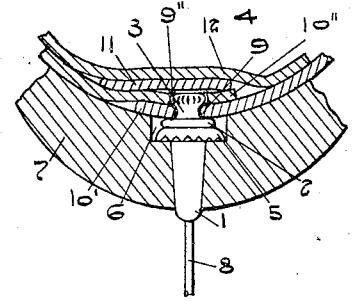

Figure 1 is a cross-section of a tire, a wheel-rim, and fastening means constructed according to my invention. Fig. 2 is a side view of part of the tire and rim, partly broken away and in section on the line $x\ x$ of Fig. 1, showing the fastening means and the position of the laps of the tire-jacket from that view. Fig. 3 is a modification of the nipple and head, in which the head has a threaded shank seated in the body of the nipple, which is oppositely threaded. Fig. 4 is a cross-section of part of the rim and tire, partly broken away, showing a modified form of the fastening means, in which a spring-head on the nipple engages with a socket in the inner lap of the jacket.

The body 1 of the nipple shown in Figs. 1 and 2 has an integral neck 3 extending above the flange 2 and terminating in the head 4. The spoke 8 is threaded to fit the nipple in the usual manner. The rim 7 has therein the usual recess 6 for receiving the bur 5, upon which the flange 2 of the nipple rests. The tire-jacket 10 has an eyelet 9 in its outer lap 10' and an eyelet 9' in its inner lap 10". The eyelets 9 and 9' are of the proper size to permit the head 4 to pass through same. The inner lap 10" of the tire-jacket has a strip 11 secured thereto for protecting the inner tube 12 of the tire against the head 4.

When the inner tube 12 is inflated, the laps 10' and 10" draw apart, so that the head 4 projects over the rim of the eyelet 9', thus preventing the accidental removal of the jacket. When the inner tube 12 is deflated, the lap 10" can be readily released from the heads 4 at any part of the tire.

All of the spoke-nipples may be made as shown; but this will not be necessary, since the tire-jacket can be firmly held by attachment to nipples of my form which alternate with nipples of the kind in ordinary use.

One of the main advantages of my construction is that the inner lap of the tire-jacket may be released from its fastening at any place where the inner tube may be punctured. This will enable the operator to draw out enough of the tube to mend same without disturbing the tire-jacket or removing same from its fastenings at other parts of the rim.

The modification shown in Fig. 3 consists of an ordinary nipple 1', interiorly threaded, with the head 4 having the neck 3, the same as in the other form shown in Figs. 1 and 2, but having a threaded shank 3', adapted to be screwed into the body of the nipple. The object of this form is to utilize the nipples in present use, providing the head with threaded shank for attachment thereto.

The modification shown in Fig. 4 consists of a nipple which is in all respects like that shown in Figs. 1 and 2 except that the head 4' is made like those in common use on glove-fasteners, being made of thin slitted resilient sheet metal. With this form of head I use a socket 9", such as used on said glove-fasteners. This is fastened to the inner lap 10" of the tire-jacket. The eyelet for the outer lap 10' is like that shown in Figs. 1 and 2.

I am aware that it is old to secure the laps of the tire-jacket together by means of studs and sockets similar to glove-fasteners and also that it is old to secure the tire-jacket to the rim by similar means. I am aware also that the spoke-nipples have been used heretofore for fastening plates to the wheel-rim, said plates having sockets therein near the sides of the nipples for receiving heads or studs on the jackets. I therefore do not claim such construction broadly.

What I do claim as my invention, and desire to secure by Letters Patent, is—

1. A spoke-nipple having a flange 2, and a neck extending above said flange of sufficient length to pass through the outer lap of a tire-jacket, and terminating in a head, substantially as and for the purpose specified.

2. A spoke-nipple having a flange 2 and a neck, extending above said flange of sufficient length to pass through the outer lap of a tire-jacket, and terminating in a head; in combination with a tire-jacket having eyelets in the outer and inner laps for receiving such head; substantially as described.

3. A spoke-nipple having an integral flange 2, and an integral neck extending above said flange of sufficient length to pass through the outer lap of a tire-jacket, and terminating in a head, substantially as and for the purposes specified.

4. A spoke-nipple having an integral flange 2, and an integral neck extending above said flange of sufficient length to pass through the outer lap of a tire-jacket, and terminating in a head, in combination with a tire-jacket having eyelets in the outer and inner laps, for receiving said head, substantially as described.

5. A spoke-nipple having an integral flange 2; an integral neck 3 extending above same and terminating in an integral head 4; in combination with an inner pneumatic tube 12, and a tire-jacket having the eyelets 9, 9' in its laps, adapted to pass entirely below said head and engage the neck and head when said inner tube is inflated; substantially as described.

Signed by me, at Chicago, this 25th day of June, 1898.

JOSEPH A. BERGER.

Witnesses:
WM. R. RUMMLER,
JOHN P. LARSON.